United States Patent [19]
Rick

[11] 4,455,748
[45] Jun. 26, 1984

[54] POSITION LOCATING APPARATUS AND METHOD

[76] Inventor: John W. Rick, 8 Cleland Pl., Menlo Park, Calif. 94025

[21] Appl. No.: 387,591

[22] Filed: Jun. 11, 1982

[51] Int. Cl.³ ............................................. G01B 5/14
[52] U.S. Cl. ..................................... 33/1 CC; 33/138; 33/1 MP; 33/1 PT
[58] Field of Search ............... 33/1 MP, 1 PT, 1 CC, 33/1 M, 403, 137, 138, 139

[56] References Cited

U.S. PATENT DOCUMENTS

| | | | |
|---|---|---|---|
| 2,595,315 | 5/1952 | Weihe | 33/1 MP |
| 3,561,125 | 2/1971 | Zeidler | 33/1 M X |
| 3,774,308 | 11/1973 | Jurentkuff | 33/138 X |

FOREIGN PATENT DOCUMENTS 16316 of 1915 United Kingdom .............. 33/1 MP

*Primary Examiner*—Harry N. Haroian
*Attorney, Agent, or Firm*—Flehr, Hohbach, Test, Albritton & Herbert

[57] ABSTRACT

A technique for plotting the provenience of an archaeological artifact with respect to a fixed reference point is disclosed herein. This technique utilizes an apparatus including a base assembly positionable at the fixed reference point, means movable to the location of the artifact from a given starting point, and means connected with the base assembly and the movable means and responsive to movement of the latter to the artifact location from its given starting point for indicating the position of the artifact location within a particular coordinate system, specifically a spherical coordinate system including coordinates $\phi$, $\theta$ and $\rho$.

3 Claims, 6 Drawing Figures

U.S. Patent  Jun. 26, 1984  Sheet 1 of 3  4,455,748
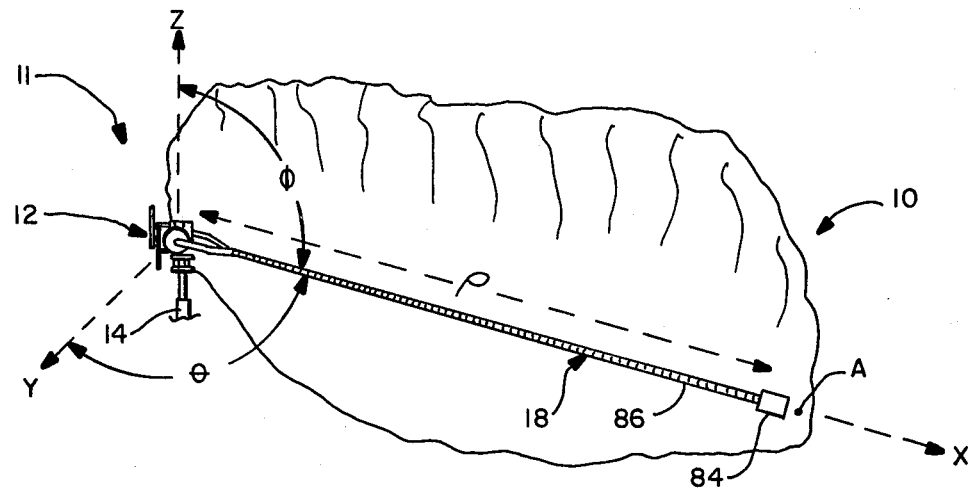
FIG.—1
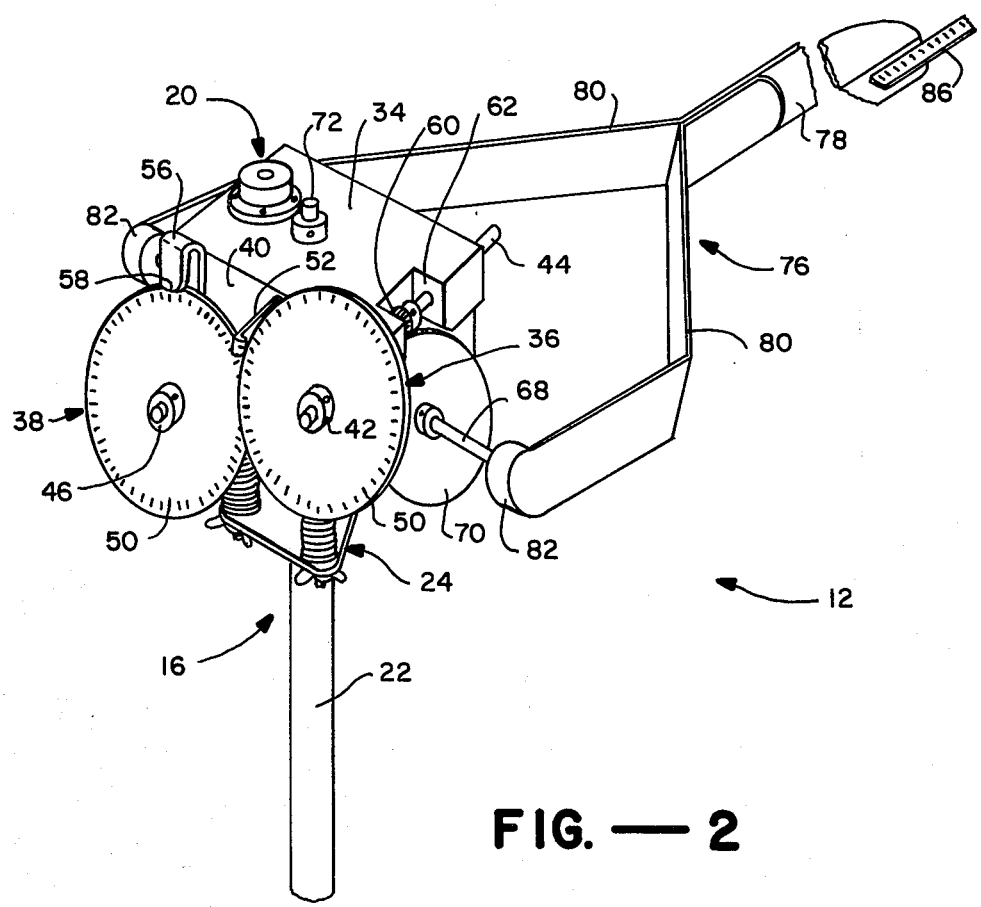
FIG.—2

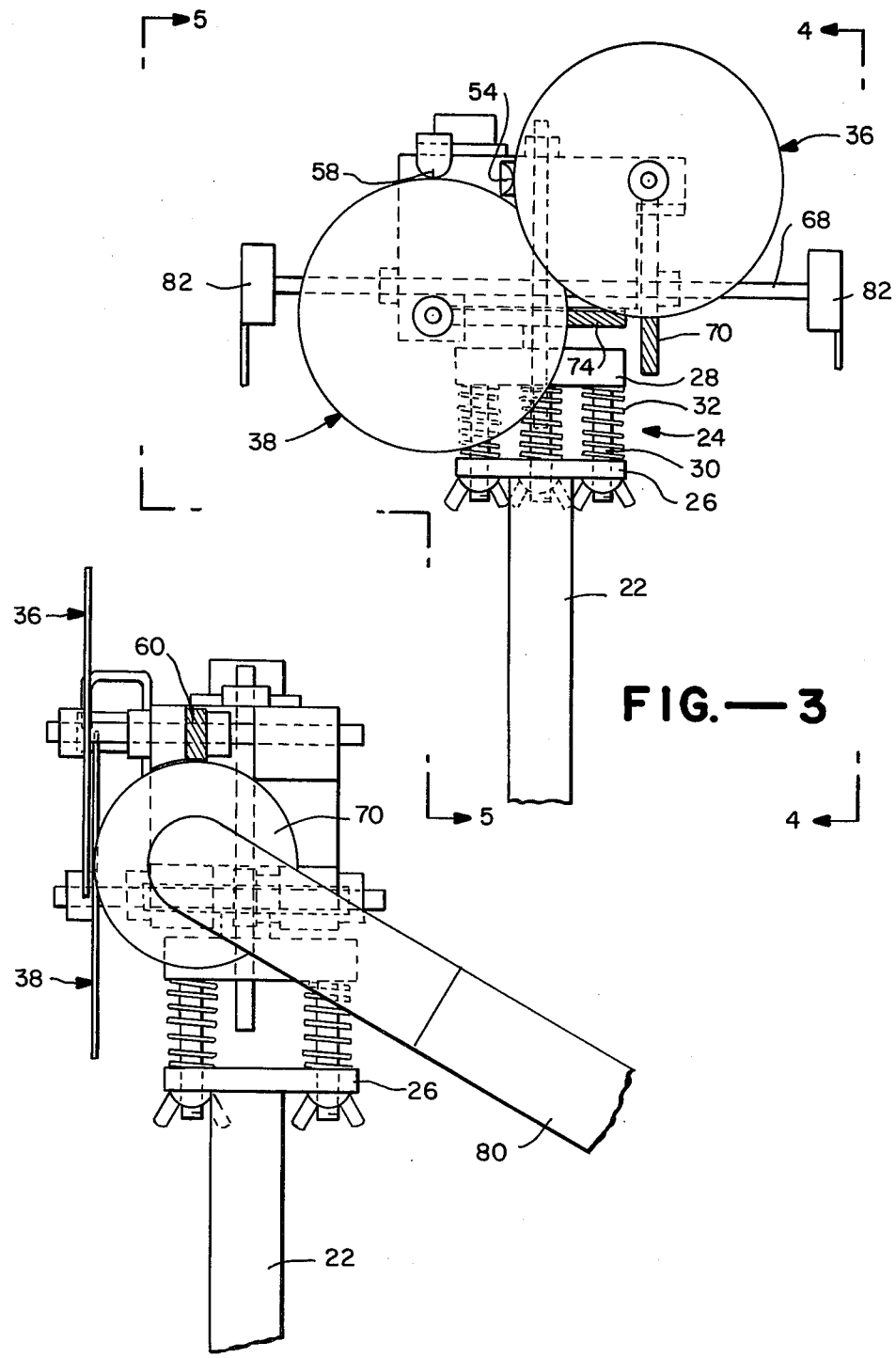
FIG.—3
FIG.—4

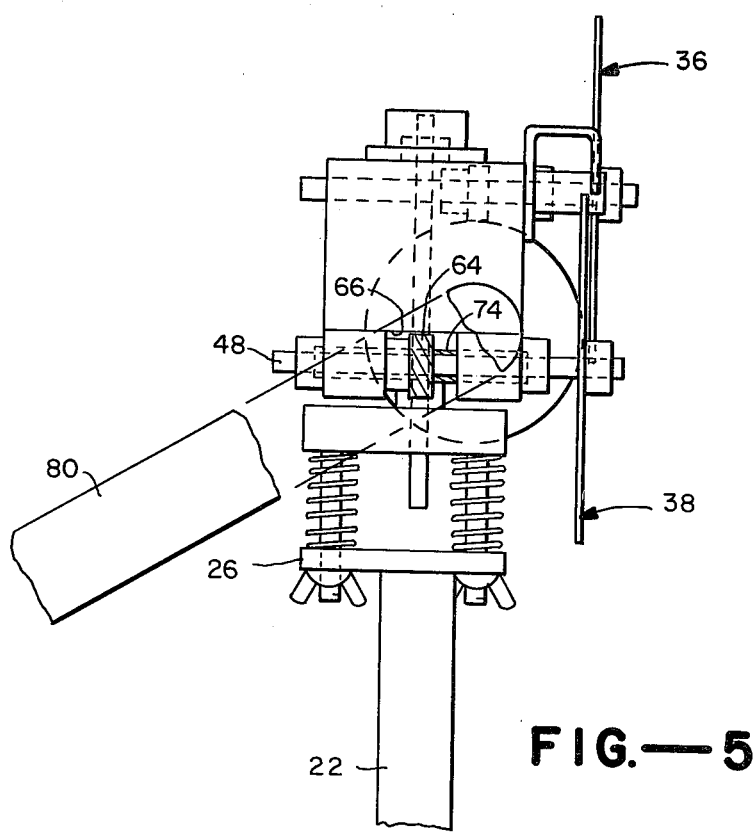
FIG.—5
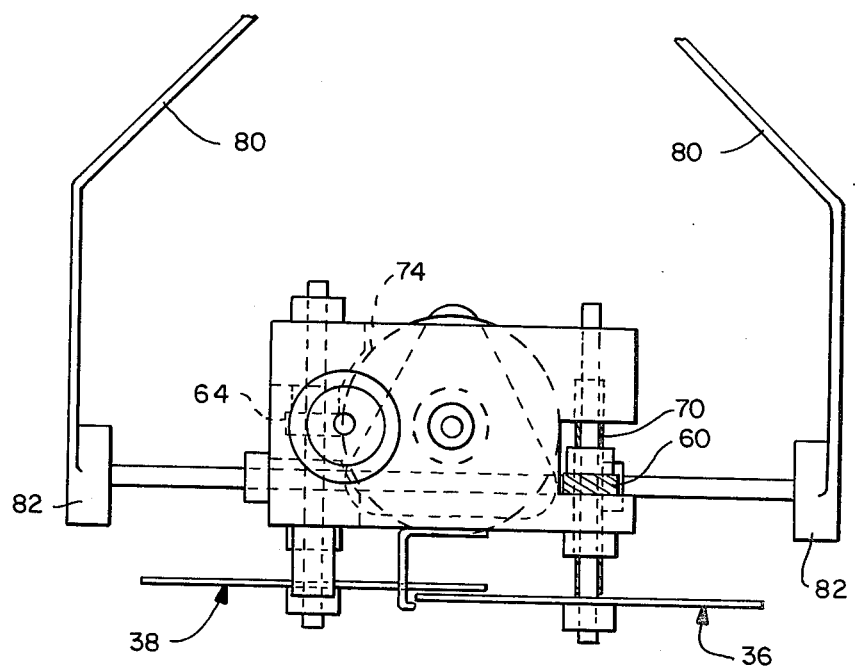
FIG.—6

POSITION LOCATING APPARATUS AND METHOD

The present invention relates generally to locating a given point in space relative to a fixed reference point and more particularly to a specific technique for plotting the provenience of an archaeological artifact within a spherical coordinate system.

Heretofore, the standard technique for plotting the provenience of an archaeological artifact has required establishing fixed reference points for each artifact (which, in turn, has required taking a relatively large number of initial measurements in order to obtain these reference points). This approach is quite time consuming and not always accurate.

In view of the foregoing, it is a primary object of the present invention to provide a more rapid and reliable technique for plotting the provenience of an archaeological artifact.

Another object of the present invention is to provide a plotting technique which may be carried out in an uncomplicated manner without requiring technical expertise.

Still another object of the present invention is to provide an uncomplicated and yet reliable apparatus which rapidly and reliably indicates the position of a given point within a specific coordinate system, preferably a spherical coordinate system, and thus an apparatus which is especially suitable for use in plotting the provenience of an archaeological artifact with respect to a fixed reference point.

Yet another object of the present invention is to provide an apparatus of the last-mentioned type for plotting the locations of a number of different archaeological artifacts relative to the same fixed reference point, whereby all measurements are taken in reference to one central point, instead of using a Cartesian system requiring at least three functioning reference points (two horizontal and one vertical).

As will be discussed in more detail hereinafter, the plotting technique disclosed herein utilizes an apparatus designed in accordance with the present invention. This apparatus includes first means adapted for positioning at a fixed reference point, second means movable to the location of the artifact from a given starting point and third means connected with the first and second means and responsive to movement of the second means to the artifact location from its given starting point for indicating the position of the artifact location within a specific coordinate system having the fixed reference point as its origin. In this way, the first means can be fixedly positioned at the fixed reference point and the second means can be successively moved to the location of each of a number of different artifacts. With each movement of the second means to a particular artifact, the third means can be used to indicate the position of that artifact, and the position so indicated can be duly recorded. In this way, the locations of all of the artifacts relative to a single reference point can be determined and recorded in a rapid and reliable manner without having to take any more reference measurements than those necessary for establishing the location of a single fixed reference point.

The present plotting technique and the apparatus used therewith will be discussed in more detail hereinafter in conjunction with the drawings wherein:

FIG. 1 is a perspective view of the situs of an archaeological dig and an arrangement designed in accordance with the present invention for plotting the provenience of an artifact at the dig with respect to a fixed reference point within a spherical coordinate system;

FIG. 2 is a perspective view of a locating apparatus designed in accordance with the present invention and especially suitable for use in the plotting arrangement illustrated in FIG. 1;

FIG. 3 is a front elevational view of the apparatus shown in FIG. 2;

FIG. 4 is a side elevational view of the apparatus shown in FIG. 2, taken generally along line 4—4 in FIG. 3;

FIG. 5 is a side elevational view of the apparatus shown in FIG. 2, taken geneally along the line 5—5 in FIG. 3; and FIG. 6 is a top plan view of the apparatus shown in FIG. 2.

Turning now to the drawings, wherein like components are designated by like reference numerals throughout the various figures, attention is first directed to FIG. 1 which, as stated above, illustrates the situs of an archaeological dig. The dig is generally indicated by the reference numeral 10 and is illustrated within a conventional spherical coordinate system including the coordinates $\theta$, $\phi$ and $\rho$. An arrangement for plotting the provenience of an archaeological artifact found in the dig with respect to a fixed reference point at the dig is also illustrated in FIG. 1 and generally designated by the reference numeral 11. Arrangement 11 includes an apparatus 12 supported by suitable means 14 at the fixed reference point just mentioned which reference point is also the origin of the spherical coordinate system shown in FIG. 1. For reasons to become apparent hereinafter, a hollow pipe extending upward from and fixed in the ground preferably serves as means 14. The apparatus 12, in turn, serves to locate within the spherical coordinate system a given archaeological artifact generally indicated at A. More specifically, as will be seen hereinafter, apparatus 12 rapidly and reliably provides its user with the coordinates $\theta$, $\phi$ and $\Delta$ associated with the location of artifact A within the spherical coordinate system without having to establish the fixed reference point itself, that is, the origin of the coordinate system.

Referring to FIGS. 2-6, attention is now directed to the structural details of apparatus 12. This apparatus is shown including an apparatus support assembly 16, an assembly 18 (see FIG. 1) movable to the location of given artifact A from a starting point, and an assembly 20 (which includes a portion of assembly 18) responsive to the movement of assembly 18 to the artifact location from its starting point for indicating the position of the artifact location within the previously described spherical coordinate system. As will be described in more detail hereinafter, assembly 16 serves to support assembly 20 at the selected reference point which also defines the origin of the spherical coordinate system. Assembly 18 is directly interconnected with assembly 20 and, at the same time, includes a component movable from its point of interconnection to artifact A. In response to this movement, assembly 20 automatically indicates by appropriately calibrated dials the $\theta$ and $\phi$ coordinates associated with the artifact location. At the same time, assembly 20 using a part of assembly 18 automatically indicates the $\rho$ coordinate.

Referring specifically to FIGS. 2 and 3, overall support assembly 16 is shown including a vertically extending post 22 having a bottom end section designed to fit within previously recited pipe 14 in a fixed fashion. Assembly 16 also includes a base mechanism 24 located above and mounted to the top end of post 22. As best seen in FIG. 3, mechanism 24 includes a bottom horizontal plate 26 and a vertically spaced top horizontal plate 28 which are interconnected to one another by three vertically extending, spaced apart bolts 30, each of which is surrounded by a compression spring 32 disposed between the two plates. The bolts and associated compression springs serve to support the top plate in an adjustably fixed position relative to the bottom plate so that the top plate may be made level, that is, truly horizontal within the previously recited coordinate system. This is important since the top plate serves as the base for assembly 20 as will be seen below.

Referring now to assembly 20, it is shown in FIGS. 2-6 including a generally rectangular main body 34 which serves as the primary support means for the rest of the components making up the assembly. These components include a pair of indicating dials 36 and 38 disposed directly in front of the front face 40 of body 34 in a slightly overlapping fashion. Indicating dial 36 is fixedly connected by suitable means such as locking hub 42 to the front end of a rearwardly extending shaft 44 which extends through cooperating openings in body 34 and is supported therein for free rotation. In a similar fashion, dial 38 is fixedly supported by locking hub 46 to the front end of a second rearwardly extending shaft 48 extending through cooperating openings in body 34 and supported by the latter for free rotation. In this way, each of the dials is rotatable along with its associated shaft independent of the other dial. As will be seen hereinafter, dial 36 is provided to indicate the $\phi$ coordinate associated with the location of artifact A while dial 38 is provided for indicating its $\theta$ coordinate. To this end, each of the dials includes the necessary indicia generally indicated at 50 on its face. A first clip 52 is bolted or otherwise fixedly connected to the front face 40 of support body 34 adjacent the outer periphery of dial 36 and includes a fixed marker 54 associated with the dial. A second clip 56 is also bolted or otherwise suitably connected with the front face 40 of support body 34 adjacent the outer periphery of dial 38 and includes its own fixed marker 58 associated with this latter dial.

In order to cause the dials 36 and 38 to rotate in response to movement of assembly 18, a first reduction gear 60 is fixedly disposed around a section of shaft 44 within a pocket 62 provided in support body 34 (see FIG. 2) and a second reduction gear 64 is fixedly disposed around a section of shaft 48 in a similar pocket 66 (see FIG. 5). At the same time, a horizontal coupling shaft 68 which fixedly carries its own coupling gear 70 extends through a cooperating opening in body 34 and is supported for free rotation by the latter. As best illustrated by FIGS. 3 and 4, gear 70 is coupled to gear 60 such that rotation of shaft 68 causes gear 70 to rotate which, in turn, rotates gear 60 and therefore shaft 44 resulting in the rotation of dial 36. A vertical coupling shaft 72 is fixedly disposed within a cooperating opening in body 34 and extends into a cooperating opening in the center of top plate 28 forming part of base mechanism 24. The top plate serves to support body 34 and its associated shaft for free rotation about the axis of the latter. A second, horizontal coupling gear 74 is fixedly mounted on the top surface of top plate 28 between the latter and the underside of body 34 around shaft 72. As best shown by FIGS. 3 and 5 together, gear 74 is coupled with previously recited gear 64 such that rotation of support body 34 about the axis of shaft 72 causes gear 64 to rotate around gear 74 which, in turn, causes gear 64 to rotate. This, in turn, causes shaft 48 to rotate, thereby resulting in the rotation of dial 38.

The ultimate function of each of the dials 36 and 38 is to indicate the $\phi$ or $\theta$ coordinate associated with the location of artifact A when assembly 18 is moved from its starting point to the artifact. In order to operatively connect assembly 18 with the dials, assembly 20 includes a coupling member generally indicated at 76 in FIG. 2. This member is somewhat Y-shaped in configuration and thereby includes a base leg 78 and a pair of top legs 80. The uppermost ends of the top legs are fixedly connected to opposite ends of shaft 68 by suitable coupling means 82. In this way, movement of base leg 78 about the axis of shaft 68 also causes the latter to rotate about its own axis and thereby causes dial 36 to rotate in proportion to movement of the base leg through gears 60 and 70. At the same time, rotation of base leg 78 about the axis of shaft 72 causes the entire support body 34 to rotate about the shaft which, in turn, causes dial 38 to rotate proportionately through gears 64 and 74. As best illustrated by FIGS. 3 and 4, the two coupling shafts 68 and 72 cross one another and are positioned very close together at the crossing point which functionally becomes the previously described fixed reference point or origin of the spherical coordinate system.

As stated above, coupling member 76 may be rotated about the axis of horizontal coupling shaft 68 or it may be rotated about vertical coupling shaft 72. These movements may be provided simultaneously, thereby allowing the free end of base leg 78 to pivot arcuately (from a fixed radius) about the crossing point of the two coupling shafts. As stated above, this crossing point corresponds to the origin of the previously mentioned spherical coordinate system (see FIG. 1). The vertical component of this arcuate movement corresponds to the $\phi$ coordinate within this system and causes dial 36 to rotate a proportionate amount. Its horizontal component of arcuate movement corresponds to the $\theta$ coordinate of the system and causes the dial 38 to rotate a proportionate amount. Thus, by appropriately calibrating each of the dials 36 and 38 with respect to its fixed marker 54 and 58, respectively, which can be readily done, these two dials will automatically indicate the $\phi$ and $\theta$ coordinates associated with the position of the free end of base leg 78 relative to the crossing point of shafts 68 and 72. In the particular embodiment illustrated, the specific gears 60, 70 and 64, 74 are designed to provide a 4:1 turn ratio between dials 36, 38 and coupling member 76. More specifically, each dial rotates 360° for each quarter rotation of its corresponding component of arcuate movement of the coupling member. This provides for a more accurate measurement of both the $\phi$ and $\theta$ coordinates than would be the case if the gears provided, for example, a 1:1 turn ratio.

Returning now to FIG. 1, attention is directed to assembly 18. As stated previously, this assembly serves two purposes. First it acts as the means movable to the particular artifact location for causing the $\phi$ and $\theta$ dials to rotate. Second, it forms part of assembly 20 by indicating the $\rho$ coordinate associated with its movement, as will be discussed hereinafter. To these ends, assembly 18 may be a conventional type of retractable tape measure device including a housing 84 and a laterally rigid tape measure 86 which is movable into and out of the housing in a retractable fashion. The otherwise free end of tape measure 86 is fixedly connected by any suitable means to the free end of base leg 78 forming part of coupling member 76, as best seen in FIG. 2. In this way, tape measure housing 84 actually serves as the means movable to the artifact location from a given starting point by being movable from a point adjacent the free end of base leg 78 (e.g. its starting point) to an extended position adjacent artifact A. This may require three components of movement within the spherical coordinate system, a $\phi$ component, a $\theta$ component and a $\eta$ component. It should be apparent that these first two components of movement cause base leg 78 to move in a corresponding manner which, in turn, causes corresponding movement of each of the dials 36 and 38. At the same time, the $\rho$ coordinate within the spherical system corresponds to the straight line distance between the coordinate system's origin and the location of artifact A and thereby can be readily indicated by tape measure 86 coupled with a fixed value (the distance from the free end of leg 78 to the origin of the coordinate system). This fixed value could be incorporated into the indicia of the tape measure.

Having described apparatus 12, it should be quite clear that this apparatus and pipe 14 provide for an overall arrangement for plotting the provenience of an archaeological artifact with respect to a fixed reference point within the spherical coordinate system. All that is necessary is that the location of pipe 14 be initially established and readily reproducible and that the apparatus 12 be mounted to the pipe in the manner described previously. Thereafter, in order to record a location of any given artifact A relative to the fixed reference point, all that is necessary is that the tape measure housing be moved to the artifact location and the $\phi$, $\theta$ and $\rho$ coordinates be recorded from dials 36 and 38 and tape measure 86, respectively. This procedure may be repeated successively for each artifact. It should also be clear that the apparatus 12 may also be used for other reasons which require plotting specific points within a spherical coordinate system, although it has been especially designed for the purpose described herein. Moreover, while mechanical dials 36 and 38 are used in the actual, preferred embodiment of the present invention, coupling member 76 could be used to drive an electronic readout which would visually display $\phi$ and $\theta$.

In addition to the above it should also be clear that the present apparatus 12 will improve the accuracy of the measurements obtained and this can be carried out in a more rapid fashion than heretofore possible. Moreover by operating in the spherical coordinate system described with apparatus 12, most errors in individual measurements will be clearly apparent as the point being measured will, as a result of the inaccuracy, most likely lie outside any reasonable expected bounds. This, in turn, will bring any errors to the attention of any individual subsequently analyzing the measurements.

What is claimed is:

1. An arrangement for plotting the provenience of an archaeological artifact with respect to a fixed reference point, said arrangement comprising:
   (a) an apparatus including
      (i) first means positionable at said fixed reference point,
      (ii) second means movable to the location of said artifact from a given starting point, and
      (iii) third means connected with said first and second means and responsive to the movement of said second means to said artifact location from its given starting point for indicating the position of said artifact location within a specific spherical coordinate system having said fixed reference point as its origin and including the coordinates $\rho$, $\theta$, $\phi$, said third means including individual means respectively responsive to said movement of said second means for indicating the particular $\rho$, $\theta$ and $\phi$ coordinate values associated with the particular location of said artifact, said $\theta$ indicating means including a first indicating dial, means for supporting said dial for rotation, and means responsive to the horizontal angular component of movement of said second means about said fixed reference point for rotating said dial in a way which corresponds to said horizontal angular component and therefore the $\theta$ coordinate value associated with the particular location of said artifact, said $\phi$ indicating means including a second indicating dial, means for supporting said second dial for rotation, and means responsive to the vertical angular component of movement of said second means about said fixed reference point for rotating said second dial in a way which corresponds to said vertical angular component and therefore the $\phi$ coordinate value associated with the particular location of said artifact, and said $\rho$ indicating means including a retractable, laterally rigid tape measure, and means for connecting one end of said tape measure with each of said $\theta$ and $\phi$ dial rotating means so that the other end of said tape measure serves as said second means movable to the location of said artifact from a given starting point, the straight-line distance between the ends of said tape measure corresponding to the $\rho$ coordinate value associated with the particular location of said artifact; and
   (b) means cooperating with the first means of said apparatus for fixedly supporting said first means at said reference point, whereby said apparatus can be used for plotting the provenience of various archaeological artifacts with respect to said reference point by indicating the position of each within said coordinate system.

2. An apparatus especially suitable for use in an arrangement for plotting the provenience of an archaeological artifact with respect to a fixed reference point, said apparatus comprising:
   (a) first means adapted for positioning at said fixed reference point,
   (b) second means movable to a given location such as the location of said artifact from a given starting point which is fixedly located relative to said first means, and
   (c) third means connected with said first and second means and responsive to the movement of said second means to said given location from its given starting point for indicating the position of said given location within a specific spherical coordinate system having said fixed reference point as its origin and including coordinates $\rho$, $\theta$, $\phi$, said third means including individual means respectively responsive to said movement of said second means for indicating the particular $\rho$, $\theta$ and $\phi$ coordinate values associated with said given location, said $\theta$ indicating means including a first indicating dial, means for supporting said dial for rotation, and means responsive to the horizontal angular component of movement of said second means about said fixed reference point for rotating said dial in a way which corresponds to said horizontal angular component and therefore the $\theta$ coordinate value associated with said given location, said $\phi$ indicating means including a second indicating dial, means for supporting said second dial for rotation, and means responsive to the vertical angular component of movement of said second means about said fixed reference point for rotating said second dial in a way which corresponds to said vertical angular component and therefore the $\phi$ coordinate value associated with said given location, and said $\rho$ indicating means including a retractable, laterally rigid tape measure, and means for connecting one end of said tape measure with each of said $\theta$ and $\phi$ dial rotating means so that the other end of said tape measure serves as said second means movable to said given location from a given starting point, the straight-line distance between the ends of said tape measure corresponding to the $\rho$ coordinate value associated with said given location.

3. An apparatus for indicating the position of a given point within the spherical coordinate system including the coordinates $\rho$, $\theta$ and $\phi$, said apparatus comprising:
(a) a base assembly including
  (i) a vertically extending post adapted for positioning at a fixed reference point,
  (ii) a flat support base disposed above said post, and
  (iii) means for supporting said base with and in an adjustably fixed position relative to said post so that said base may be made horizontally level relative to the ground when the post is maintained in a vertically extending or approximately vertically extending position at said fixed reference point;
(b) an assembly for indicating the $\theta$ and $\phi$ coordinates of said point within said spherical coordinate system, said assembly including
  (i) means arcuately movable about said fixed reference point in a way which includes a horizontal component of arcuate movement and a vertical component of arcuate movement,
  (ii) first and second dials for indicating said $\theta$ and $\phi$ coordinates, respectively.
  (iii) means for supporting each of said dials for rotation, and
  (iv) first and second means responsive to said horizontal and vertical components of arcuate movement, respectively, for rotating said first and second dials in ways which correspond to said horizontal and vertical components, respectively; and
(c) a retractable type of tape measure assembly including a housing, a laterally rigid tape measure movable into and out of said housing and means for connecting the otherwise free end of said tape measure with the moving means forming part of said $\theta$ and $\phi$ indicating assembly such that arcuate movement of said tape measure housing about said fixed reference point causes said moving means to move in a corresponding manner thereby include said horizontal and vertical components, said tape measure housing also being movable radially relatively to the otherwise free end of the tape measure so as to take in and let out the latter relative to said housing, whereby said tape measure housing can be moved to said given point relative to said reference point, thereby causing said first and second dials to move in a corresponding manner and indicate the $\theta$ and $\phi$ coordinates for said point while said tape measure indicates the $\rho$ component.

* * * * *